United States Patent [19]
Fors

[11] Patent Number: 5,945,332
[45] Date of Patent: Aug. 31, 1999

[54] CYLINDRICAL SIEVING AND COMPOSTING DEVICE AND A METHOD USING THE DEVICE

[76] Inventor: Krister Fors, Tunnlandsgatan 11, S-421 38 Västra Frölunda, Sweden

[21] Appl. No.: 09/000,431

[22] PCT Filed: Jul. 1, 1996

[86] PCT No.: PCT/SE96/00876

§ 371 Date: Jan. 12, 1998

§ 102(e) Date: Jan. 12, 1998

[87] PCT Pub. No.: WO97/03023

PCT Pub. Date: Jan. 30, 1997

[30] Foreign Application Priority Data

Jul. 12, 1995 [SE] Sweden ................................. 9501645

[51] Int. Cl.⁶ ................................. C05F 3/06; C05F 9/02; C12M 1/06
[52] U.S. Cl. .................. 435/262; 435/290.3; 435/290.4; 71/9; 210/609
[58] Field of Search .............................. 435/290.1, 290.4, 435/290.3, 262; 71/8–10; 4/DIG. 12; 210/150, 609, 770, 771

[56] References Cited

U.S. PATENT DOCUMENTS

| | | |
|---|---|---|
| 4,196,082 | 4/1980 | Salokangas et al. . |
| 4,204,958 | 5/1980 | Kaelin . |
| 4,213,864 | 7/1980 | Asikainen . |
| 4,254,515 | 3/1981 | Kiyama et al. . |
| 4,255,389 | 3/1981 | Jung et al. . |
| 4,633,535 | 1/1987 | Louvo . |
| 5,192,428 | 3/1993 | Lindstrom . |
| 5,228,984 | 7/1993 | Lindstrom . |
| 5,296,136 | 3/1994 | Abel . |
| 5,782,950 | 7/1998 | Kanitz et al. . |

OTHER PUBLICATIONS

WPIDS Abstract AN:93–043058 of SE 9201674 (Sep. 1992).

WPIDS Abstract AN: 95–262559 of SE 9303650 (May 1995).

Primary Examiner—William H. Beisner
Attorney, Agent, or Firm—Dvorak & Orum

[57] ABSTRACT

Method of continuous treatment and purification of biologically decomposable waste and liquid in a rotatably elongated perforated cylinder longitudinally divided into a dewatering and wet composting unit, a central dewatering unit and a dry composting unit. The perforated cylinder is surrounded by an envelope for collecting liquid wastes which are treated by oxygenated filter units in communication with the envelope structure. The device also includes a hollow perforated shaft within the cylinder for supplying oxygen to the interior of the cylinder and for rotating the cylinder.

13 Claims, 5 Drawing Sheets

5,945,332

CYLINDRICAL SIEVING AND COMPOSTING DEVICE AND A METHOD USING THE DEVICE

THE BACKGROUND OF THE INVENTION

The present invention relates to an apparatus which by integrating dewatering/sludge separation, the purification of liquid and a composting process of the solid separated fraction such as the sludge from waste water provides a system of purification and recycling, say applicable to the waste water of a one family house, block of flats or cluster of houses (terraced houses, ecological building, small villages etc.) where a common waste water pipe is laid to the above described apparatus for the treatment and purification of waste water before being infiltrated, resorbed or being led directly to a recipient.

The outflowing water from the apparatus is free from heavy metals, nutrients, virus, pathogenic organisms, BOD/TOD, bacteria etc., and therefore can be infiltrated without a slurry (sludge) separator, distribution pipes, distribution tank and subsoil filter.

The system can also be used for other purposes of purification where organic matter is dissolved in a liquid phase and where you as well recycle the biological substance from the obtained compost fraction.

SUMMARY OF THE INVENTION

The said described apparatus promotes recycling of nutrients in for example waste water (N,P,K etc) by obtaining a compost fraction from waste water sludge etc., and purifying the outflowing water effectively by a gradual filtration through specifically arranged and designed steps of filters for the purification process.

Dewatering occurs in the said apparatus by a step by step adjusted dewatering device according to the particle size of the solid fraction.

Thanks to the construction of the apparatus and the process there it can be installed in the subsoil, basement, built into a separate building or being dug down into the ground. The final step of filtration can be installed into the ground at a lower level than the apparatus itself.

With a local solution close to the source more conscious consumers and producers of waste will be the result of it all, and thereby more effective, cleaner, renewed and recycled waste fractions for the individual and for society.

As for the local society with an option to make use of human urine, especially concerning the collection, storing and transportation to the consumer a separation of the urine and preferably of the grey water (from bathing, shower, washing etc.,) can be carried through in order for the said apparatus to purify toilet waste water only.

Figure 1:
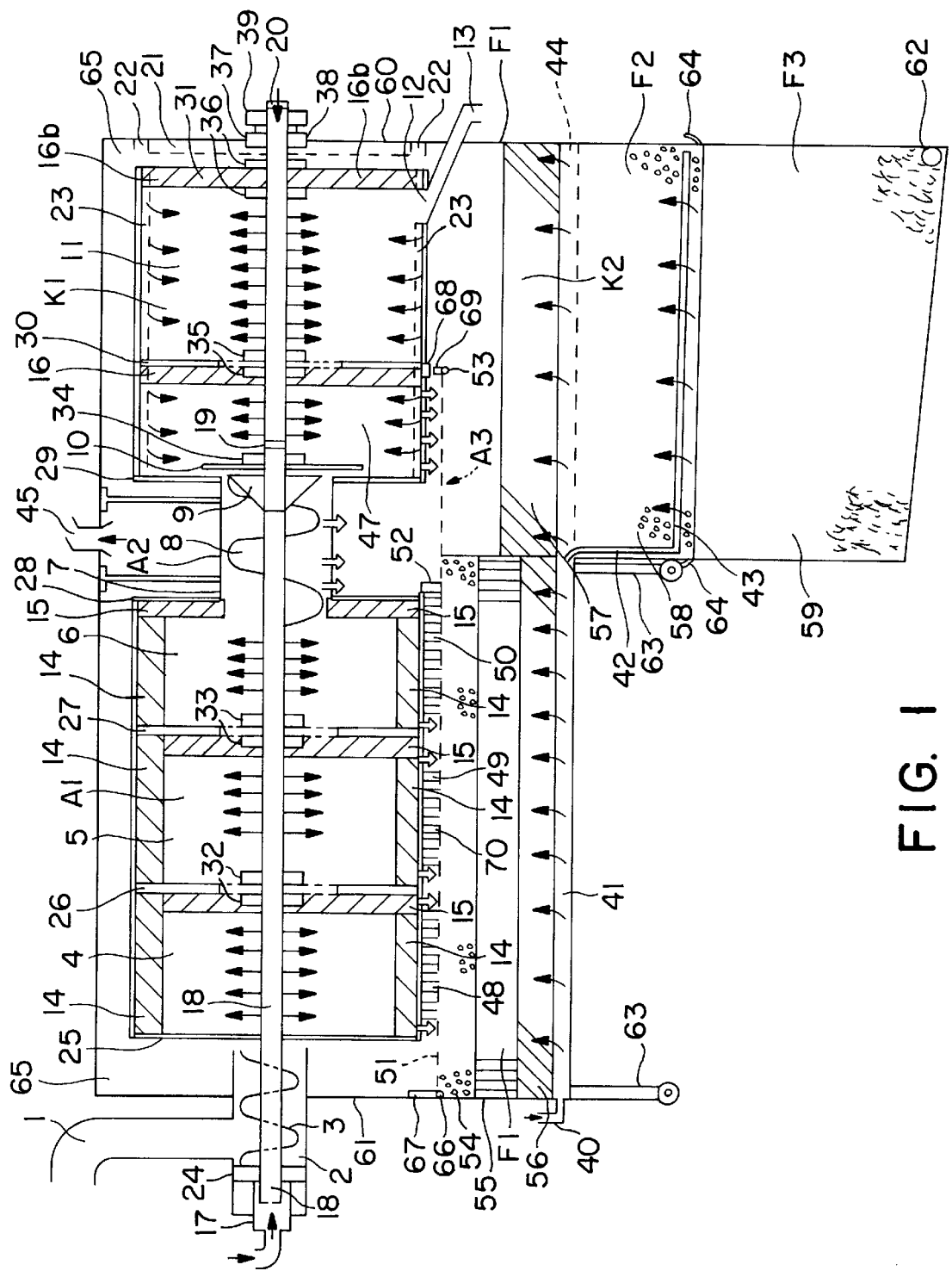
FIG. 1 shows a first embodiment of a system according to the invention.
Figure 2:
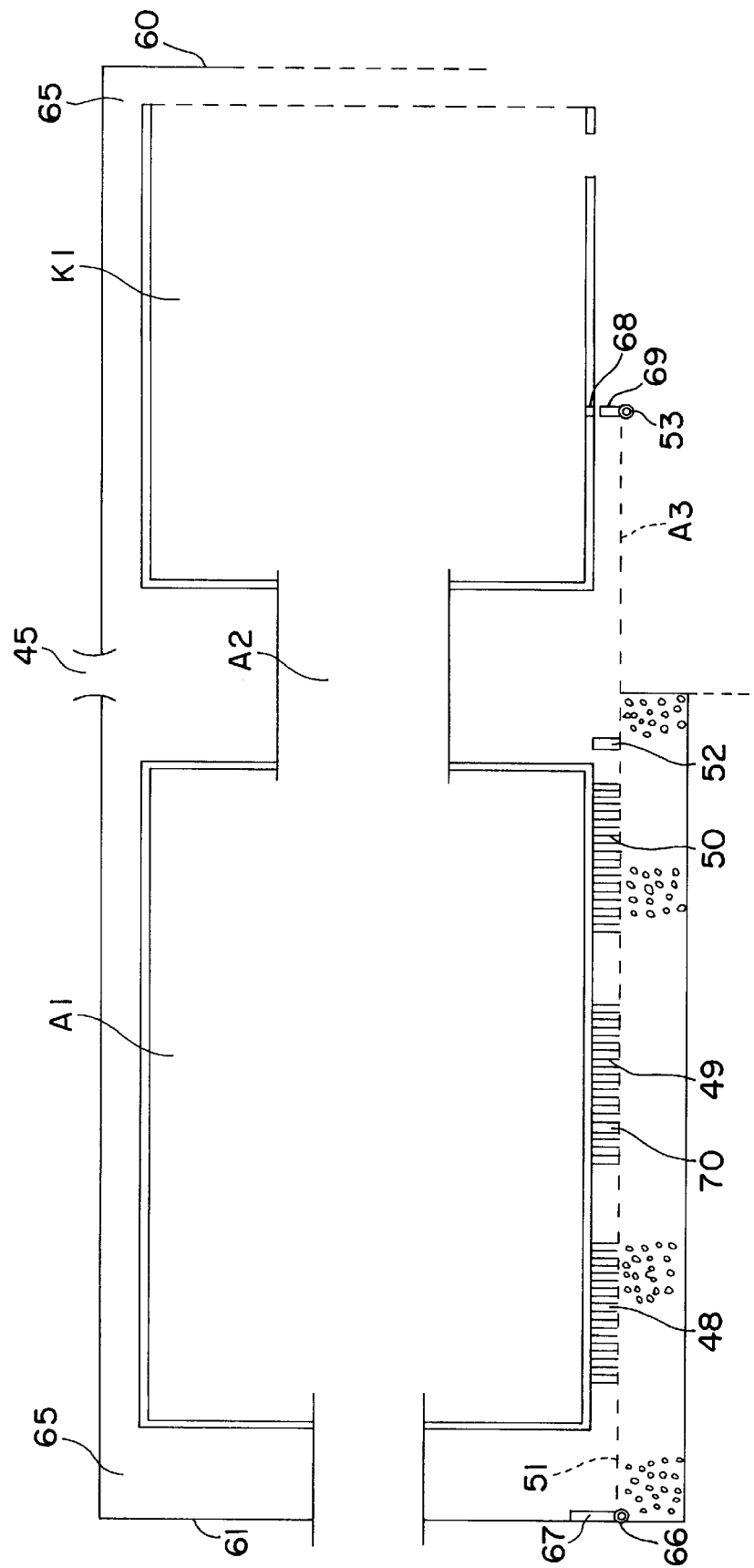
FIGS. 2–4 show the details of the shaking plate structure used within the system.
Figure 3:
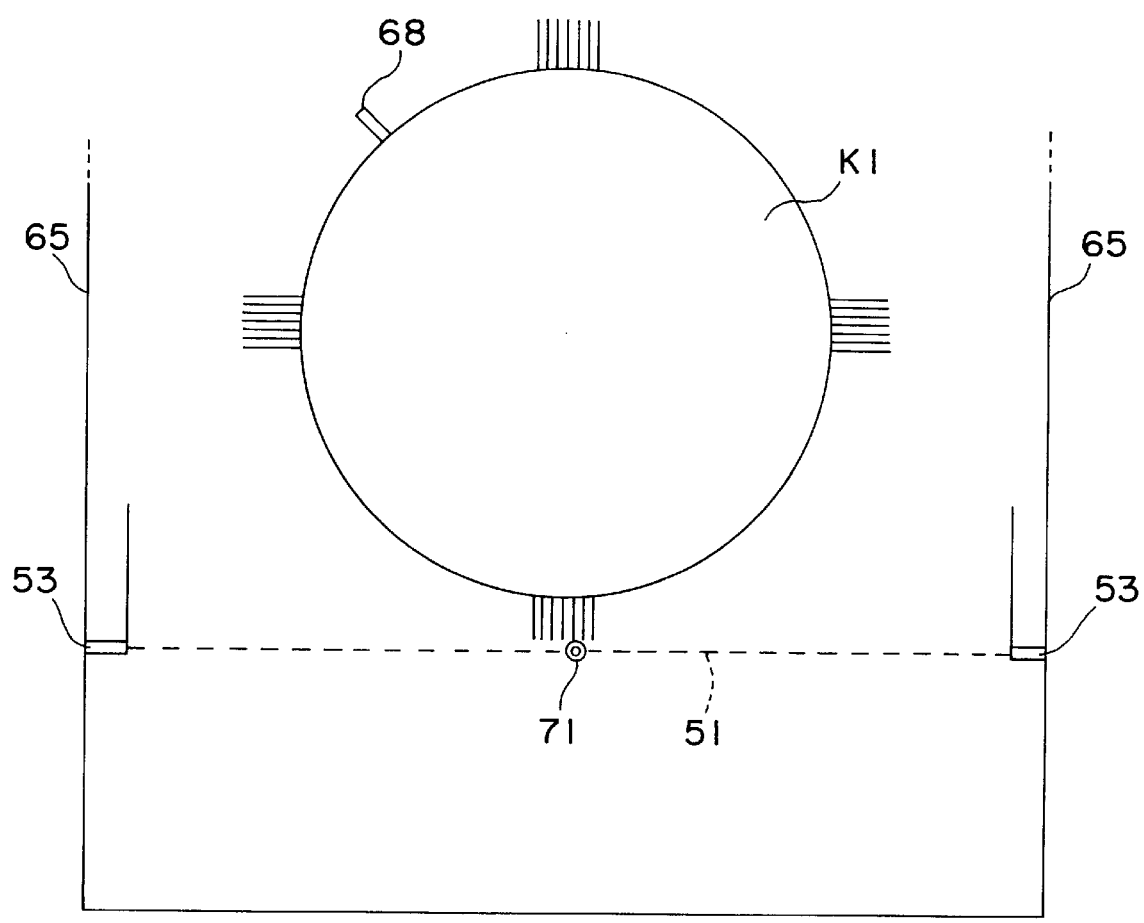
Figure 4:
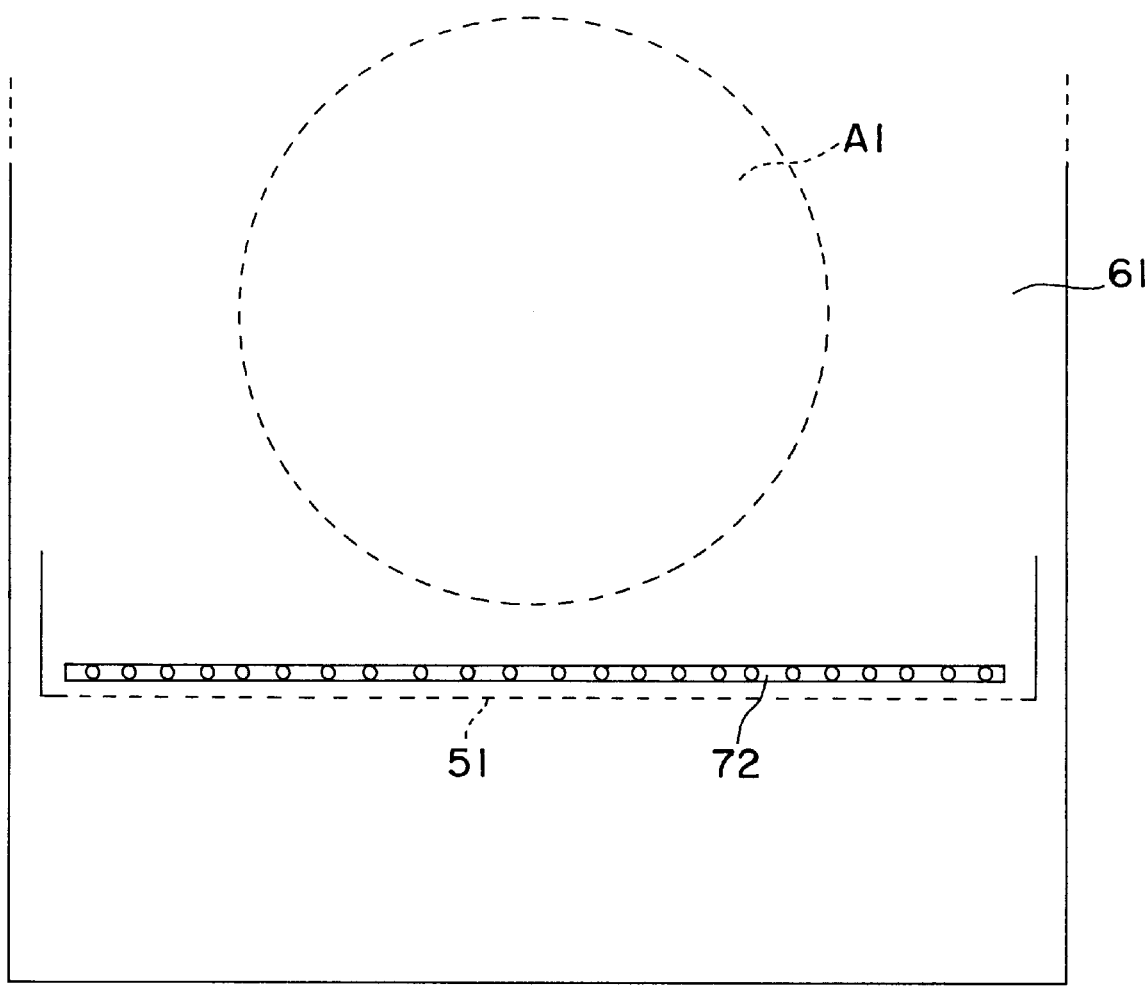

Technical effects of the apparatus on society, enviroment and individual are as follows:

1. The process is not disturbed by surface water and makes a local treatment of surface-water possible in for example sub surface filters, wells, ponds, wetlands etc.

2. The process is not affected by fluctuations of the temperature (seasons, day and night).

3. The process is not affected by changes of waste water flow during 24 hours thanks to the separation into process chambers where for example dewatering takes place in the first chamber (4) at low rates of flow and in the other chambers (5-6) at higher rates of flow. Some degree of liquid composting also takes place in the process chambers (4–6) during hours of a low rate of flow.

4. A good sanitation owing to the liquid composting process and to the dry composting process during a relatively extended retention time of the solids with high temperatures (50–60 degrees Celsius). These effects of sanitation are more difficult to obtain in liquid composting only, three-compartment septic tanks and open settling basins of purifying plants during seasonal changes.

5. Intermittent flows of waste water also provide fluctuating access of nutrients for the microorganisms. These circumstances affect a large number of bacteria populations so that they during a certain period of time, when lacking of for example phosphorus, are capable of building into the cell a larger amount of phosphorus than normally; that is when larger supplies are available at such occasion as the fluctuating flows of household waste water.

In the biological film generated in the filters (54,58) with so called trickling filter material as well as in the micropores, phosphorus is stored so that the population of bacteria can multiply even during low flows of nutritious waste water. The similar effects are likely to take place in the rest of the filters.

6. With a filter structure out of biological material (filter 57 etc.) also a decomposition and sorption of nitrogen, phosphorus etc. will occur.

Such filters may be recycled to the composing phase of the apparatus.

7. Filters with a specific construction adjusted for specific substances, such as heavy metals can be made to be inhabited by heavy metal eating microorganisms or made to adsorbe the said substance physically or chemically. In the latter case the filter is constructed so that it can be safely dumped.

8. By having a filtration technique adjusted to different substances/bacteria the specific substance is made to be adsorbed to the filter or decomposed by bacteria in order for these substances to be renewed or safely disposed of.

9. The processes can effectively be checked up on and supervised (temperature, filtration capacity, sludge separation capacity etc.).

10. The processes are selfcontained, i.e. minor pollution load upon air, water and ground from pathogenic organisms, virus, bacteria, heavy metals, nutrients etc.

The apparatus is capable, by means of its different devices of process enclosed in a compact envelope (devices of dewatering, composting, filtration etc.), easily to be equipped with a heat exchanging of the exhaust air/recirculated air heat and be equipped with a biological filter in the exhaust air to minimize odours and the spreading of air-born microorganisms.

11. A system adjusted to decentralized, small scale waste water treatment, where the structure of the ground, topography, level of ground water, area available for infiltration etc. are not fitted for other conventional solutions, like infiltration into ground, sandfilters, reed infiltration beds etc.

12. A system where three-compartment septic tanks, infiltration pipes, distribution tank, filtermaterial (sand, pebbles etc.) will not be needed in order to obtain an acceptable level of water purification and an acceptable status of the compost fraction.

13. A method of treating sludge which reduces the contents of heavy metals, pathogenic organisms, parasitic ova, maggots, plant diseases and which increases the contents of micro and macro nutrients of the final compost fraction. These facts make household waste water sludge easier to market and to be used within the decentralized society and to achieve an enhanced recirculation of nutrients and humic substances in society as a whole.

14. A reduced transport of sludge to purifying plants; the processes of which are spoiled by intermittent supplies of sludge and a reduced number of vehicles with diesel engines for the suction of sludge tanks and three-compartment septic tanks and thereby a reduced necessity to enlarge and alter the structure of the purifying plant in order to handle this.

The effects of the technical processes of the apparatus are as follows:

1. High temperatures of the composting phase (liquid and dry composting) promotes the sanitation and the microbiological activity.

2. Water soluble metal ions move along with the dewatered fraction to the filter units to be decomposed/sorbed.

3. By a gradual dewatering, adjusted to the size of the solid fraction dissolved in the liquid, an effective separation of the sludge is done. In the different chambers sedimentation to a certain degree is achieved and thereafter a dewatering through the perforated cylinder (A1) and by means of the feeding screw with a cone (unit A2) and by means of a shaking plate (51). In the latter the solid and the liquid fraction are separated by sedimentation,separation in a perforated plate and by shaking and the sludge is moved forward to the filter unit (F1-57)

4. In the filter units with so called trickling filter material (54,58) the microorganisms are made to reduce the biological substance (the so called; BOD/TOC).

The consequence of this will be that in the nextcoming filter step the water has become more or less free from particles which enhances the possibilities of separation and purification of the water from other substances; for example heavy metals in these filtersteps.

5. With less BOD/TOC the possibilities of survival of the non desireable microorganisms (parasitic ova, bacteria, plant diseases etc.) are reduced. In particular virus living in water can not have an access to a host to sponge on.

6. The filter material of the filter units can in order to obtain different effects of purification of the outflowing water.

Filter unit (F1) is removed torwards the front (at 61). Filter unit (F2) is removed torwards the back (at 60) and filter unit (F3) is removed by a lifting of the apparatus by means of adjustable legs. The latter (F3) filter step is a final purification step which can be equipped with varying filter material according to the purification required. This filter step can be installed into ground or at a lower level than the rest of the apparatus.

7. By separating the units of dewatering and composting (dry composting) a more appropiate content of dry matter is obtained, a certain degree of heat is stored in the solid fraction and more undisturbed enviroment for the microorganisms and their biological processes (flows of water do not interrupt).

Fluctuations of the Ph-value do not disturb the process. An effective oxygenation of both the composting and the dewatering/liquid composting takes place, oxygen is dissolved in the water and is carried along to, say, the filter with the trickling filter media (54) and an appropiate stirring takes place in unit (K1) in the two process chambers.

8. Oxygenation with two separate systems can easily be adjusted to the levels required in the processes. Favorably two fans can be used and when required being regulated as to the number of revolutions and flow.

9. The feeding screw at the inlet of, say, waste water (3) render the feeding at any possible lower rates of flow more efficiency and when using a water flushing toilet a so called low flushing toilet can easily be installed supported by the feeding and pumping functions of the screw. It also assists during major fluctuations of flow during 24 hours.

10. The screw in the dewatering unit (A2) transports the solid fraction up against the cone (9) which momentarily make a stop for the sludge against the perforated pipe with an envelope (7) and effectively dewaters the solid fraction. In this unit (A2) the pitch of the screw and size of the screw and shape of the cone are adjustable according to the specific requirement of dewatering. Owing to this function the content of dry matter of the substance to be composed in (K1) is possible to optimize/adjust.

11. The longitudinal slits (14) in unit (A1) collect the dewatered fraction in between. The number of slits can vary according to the requirements (for example 2–4). These slits also effectively convey the water along the whole of the perforated area of the cylinder (the size of which is relatively large owing to the area of the geometry of the cylinder: The area=$2*\pi*$ the radius* the length of the cylinder) and transports the separated solid fraction forwards by the slight inclination of the apparatus—by an elevation of the front legs and by letting the water flow in the same direction bringing the solid fraction up against the shovels (15) which effectively feeds the fraction through the inlet of the reinforcement disc (26-28) and likewise (35) in unit (K1). The said shovels in unit (15) in unit (A1) and 16/16b in unit (K1) also has a collecting function of the concentrated sludge.

12. The final compost has undergone a sanitation and initial mineralization in unit (K1). Likewise is true for the solid fraction from the dewatering of the shaking plate (51) which is put into the filter (57). The compost fraction is evacuated from the apparatus in pipe (13) in order to obtain further maturity in a separate container etc. and will not constitute a sanitary hazard nor attract rats etc.

This system brings about the fact that there is no need of supervising the running of the apparatus at frequent intervals since the compost is collected in an external container in a safe way and is possible to supervise there.

13. By the effects of the above described functions/ technical devices it is evident that this apparatus makes an effective treatment and purification of for example waste water in an automized and continuous process with few interruptions of process/a process easy to supervise and control.

14. The construction and integration of the dewatering units, filter units and composting units and the fact that they function together in a continuous and automatic running of the apparatus constitutes an optimization of the effects of the said invention in a technical and social perspective comparing to the state of the art within this field.

15. The said apparatus achieves its technical effect and technical invention by the above described integration and adjustment of a mechanical and microbiological reduction of BOD/TOC to a desireable necessity of a reduced content of particles in the water phase in order to optimize the killing of virus and bacteria and make a selective purification in the subsequent steps of filter from specific substances; such as heavy metals and in order for each step of filter to achieve an optimal separation of specific substances like bacteria. The mechanical dewatering process (by sedimentation, sieving, shaking etc) makes up the conditions of the filter units to be able to optimize their functions (for example filter 54–57) during which the smaller particles are decomposed as to their size by the microorganisms.

The mechanical separation makes it possible for the composting phase to function optimally (higher content of dry materia, reduced volumes etc) and for the microorganisms in the process to obtain optimal conditions (an atomization also takes place in the screw (8) and in the cone (9) because of a grating effect there; This unit may also function as a grinding device, the effect of which on the other hand reduces the volume of this fraction and increases the flow speed of for waste water through the apparatus whereby the capacity of treatment of the apparatus increases.

DESCRIPTION OF THE PREFERRED EMBODIMENTS

At the treatment of, say, waste water (feces, flush water and possible urine and grey water) the water flows into the pipe (1) to be led through and pumped through a pipe with an envelope (2) by a screw (3) a first to chamber of a rotatable perforated aglinder. In this chamber the sewage water is distributed across the whole area by slits (14) that extends longitudinally in the cylinder.

A dewatering process occurs through the perforated cylinder all across the whole of its area down to a shaking plate (51). At larger volumes of water than can be contained in the chamber (4) the water flows over to the chamber (5). By a centered position of the reinforcement discs (26–28) a sedimentation takes place before the flowing over and meanwhile a dewatering through the perforated cylinder. The slits (14) also collect the dewatered fraction against its edges during the slow rotation of the cylinder (continuous running of the apparatus). Owing to the inclination of the apparatus (elevation of the front legs; and the direction of the flows (water), the solid fraction is being transported forwards to the inlets of the discs (26–28).

At these inlets there are shovels (15) which collect and bring the sludge through the inlet; by the rotation of the cylinder and the direction of the flowing water and the inclination of the cylinder.

The shovels at the unit (A2)—28—before the screw (8) etc feeds the sludge to the unit (A2) for further dewatering. During this state of the process larger particles/biological matter remain in the unit (A1) whereas smaller particles go with the water down to the shaking plate (51).

Shaking plate (51) consists of a perforated plate with means of sieving the smaller particles dissolved in water (drawing 1–4). A natural drainage of water now takes place through this perforated plate so that separated sludge remains on the surface of the plate.

Brushes (48–50) on the outside of the cylinder bring the sludge outwardly towards the edges of the shaking plate. By reversing the electric motor the cylinder is made to rotate in two directions, which brings about the sludge to be brought towards both the edges of the shaking plate.

The said plate is fastened to a jointed shaft (66) on the front of the external envelope (61) and to a means of attachment (67). The plate also has a jointed shaft in the longitudinal direction (71). The plate is furthermore fastened to an elastic/springy means of attachment (53) at the sides of the insulating envelope (65). The plate can thus move in its midpart, longitudinally, by elevation-lowering (joint-71-); elevation-lowering across the whole length (joint-66- and elastic/springy means of attachment) so that the sludge is transported outwardly—forward—towards a flexible plate (69). Hereby the bending of the plate (69) at the touch by peg (68) in the cylinder the sludge is made to fall down on filter (57).

By rotation of the cylinder the peg (68) touches the plate (69) at constant intervals. The number of pegs and the distance in between determines the frequency of the removal of separated sludge to filter (57).

The brushes (48–50) also make the shaking plate (51) to be bent downwards-upwards so that the water and sludge move across the whole of the plate out towards the edges then to be transported forwards by means of the described device.

A flexible plate (52) is made to let the sludge through intermittently by brush (50) bending it. It also functions as a stop and collecting plate of the water. Plate (70) functions in the same manner as plate (52).

On the internal side of the front (61) you find a distributing pipe (72) with nozzles for the flushing and cleaning of shaking plate (51) and for the forward transportation of separated sludge. This flushing can be controlled mechanically or electronically.

The separated solid fraction is moved by the shovels (15) in the chamber (6) into the dewatering unit (A2) with a screw (8), pipe with an envelope (7) and a cone (9). The rotation of the screw brings the matter out towards the edges and forward. The shape of the cone (9) makes the sludge to be pressed further against the internal side of the pipe with an envelope (7). Since this pipe is perforated the sludge 1-s further dewatered. Passing the top of the cone the matter is further pressed against the inner walls of the pipe (7) so that the dewatering is accentuated.

The liquid phase passes down to the shaking plate (51) obtaining a further dewatering there.

The liquid phase is now pressed against the plate (10) for further dewatering. Here the liquid flows down to the chamber (47) which has a perforation of its cylinder walls so that superfluous water is drained out towards the filter (57). The solid fraction undergoes a composting phase in the said chamber (47) and in the chamber (11). When the matter reaches the hatch (12) it is evacuated through pipe (13) to an external unit of storage.

Plate (10) also makes the dewatering and disposal of the solid fraction to be carried through within a limited area where an increasing number of holes can be made for a dewatering purpose.

Filter (54, 58) have so called trickling filter material with a large internal and external area for the microbiological decomposing of TOC/BOD. Here you find a liquid phase with minor particles only, that promote the work of the microorganisms in the micropores and on the surface of the material. There are water and nutrients for them here. The oxygen supply takes place beneath the filters in unit (41), the air of which is blown in pipe (40). Air is then led to unit (44) for the oxygen supply of filter (57) and to unit (43) for the oxygen supply of filter (58).

By means of a pipe in the center of the apparatus (45) the exhaust air is ventilated in order for an effective ventilation of carbon dioxide, vapour and other gases to be done. Beneath filter (57) there is a perforated plate for the distribution of water from unit (41)—The collecting and oxygen supply during the water phase takes place in the same location of installation. The distance between filter (57) and the plate; the space required for the flow of water at (44) is adjusted to the volume desired to pass there.

The filter unit (59) is removable by the elevation of the apparatus by means of adjustable wheels and by moving the apparatus in any direction. Via (64) the unit is removed. This filter constitutes a final step of purification and may be supplied with varying filter material according to the specific requirements of purification and be installed into the basement, the ground etc or removed completely.

The oxygen supply of the dewatering units (A1 and A2) is done from the direction of the front of the apparatus (61) towards unit (A2) and has a stop in the shaft/ventilation duct (18) at (19).

The air is pressed out from the shaft (18) into each chamber (4–6) and into unit (A2) through holes in the pipe (18). The excess pressure makes the water not to be pressed into the pipe. The feed pipe (17) is connected to a fan, possible to regulate as to revolutions and flows.

Unit (K1) for the composting process has its oxygen supply from the back of the apparatus (60) via a pipe (18) with a stop at (19). Here as well the oxygen supply is done by air pressed through holes in the shaft/duct (18). A fan presses the air and when required it can be regulated for the adjustment of the airflow to the process.

Further oxygen supply takes place through the ducts (23) with the same fan. Nozzles blow air into the ducts (23) that extend against the periphery of the cylinder.

The bearing (24) and the bearing (38) are devices for the rotation of the shaft (18). The bearings (32,33,35,36) lock the cylinder to the shaft (18) and are integrated in the plates (26,27,30,31).

The bearing (34) attaches the plate (10) to the shaft (18) and may rotate with it or being attached to the pipe with an envelope (7) and thus being journalled in a bearing against the shaft (18).

The pipe with an envelope (7) is attached to the roof of the envelope of the apparatus at (45).

Figure 5:
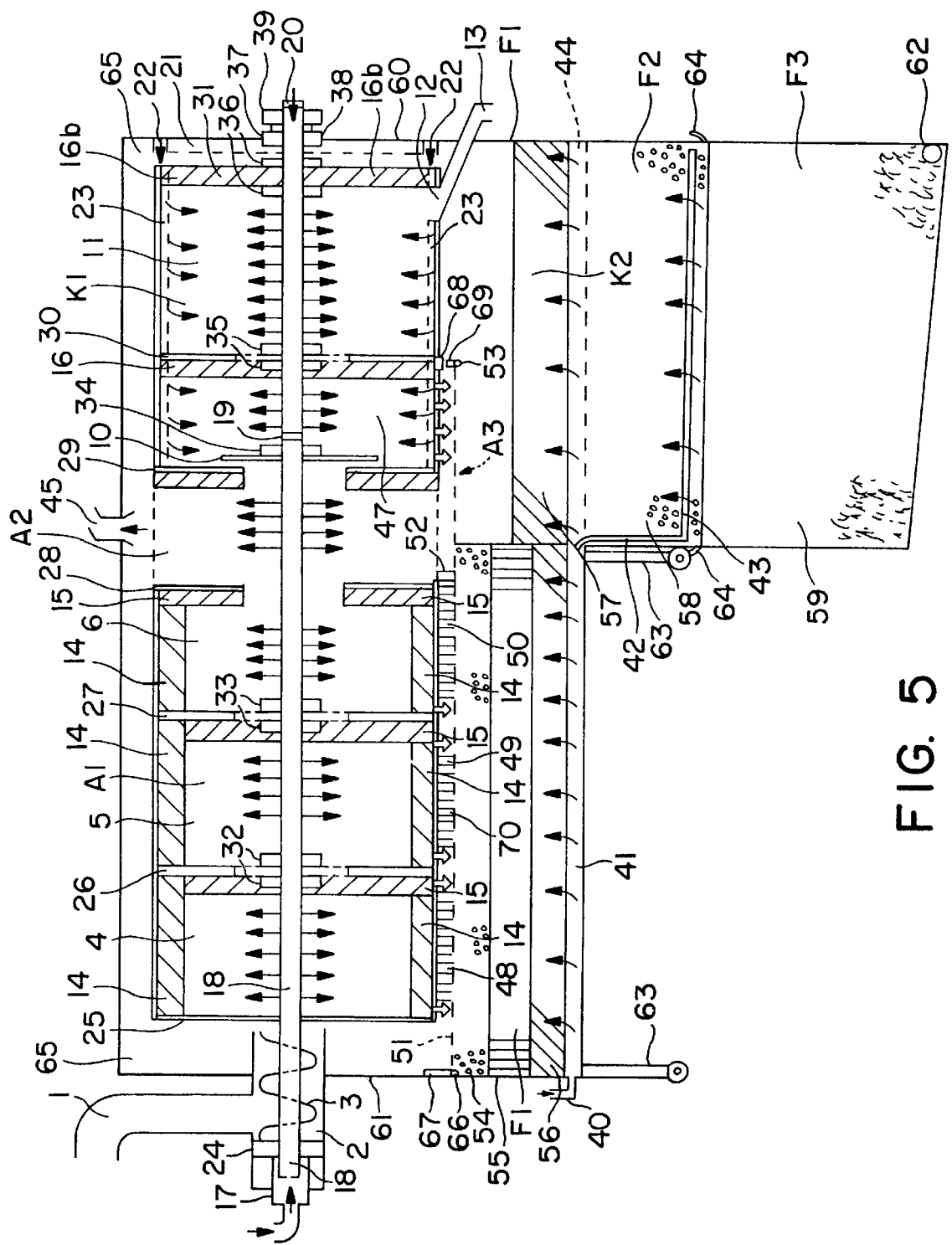
FIG. 5 shows a second embodiment of a system according to the invention.

In a second embodiment shown in FIG. 5, the dewatering unit A2 can be constructed with a perforated cylinder (73), which is removeable and changeable and connects the dewatering unit (A1) and the composting unit (K1). By the rotation of the shaft (18) the perforated cylinder (73) is also caused to rotate, during which rotation a dewatering will occur through the holes, forming part of the wall of the cylinder.

The solid fraction is transported by the inclination of the entire device towards the shovels (74) and a sealing plate (29), in the said design performed as a terminal plate of the unit (K1-cylinder-) with a center hole.

The shovels (74) collect and feed the solid fraction forward through this center hole for a further dewatering against the plate (10) and dosing with the same plate (10) to the composting unit (K1-chamber 47-).

The further process and process devices are identical with the first design.

By the said design the perforated cylinder can be changed according to the demand of dewatering (the type of material: the dry substance, the viscosity etc.). That is by a variation of the number of the holes and diameter of the holes of the perforated cylinder a varying degree of dewatering is achieved.

I claim:

1. A method for continuously treating and purifying biologically decomposable solid and liquid waste material in a rotatably elongate perforated cylinder having a first, front end wall and a second, back end wall, said cylinder divided into a front-most combined dewatering and wet composting unit, a central dewatering unit, and a dry composting unit, said dry composting unit including a plurality of spaced ducts formed on an inner periphery thereof, an envelope surrounding said perforated cylinder, said envelope having a front and back end wall corresponding to said end walls of said cylinder, means for feeding said biologically decomposable solid and liquid wastes into said cylinder through said first end wall, a rotatable, elongate, hollow shaft having a plurality of circumferentially disposed holes along the length thereof, said shaft centrally supported within said cylinder and attached to said cylinder so as to cause rotation of said cylinder upon a rotation of said shaft, said shaft extending beyond said front and back end walls of said cylinder and said envelope, and a plurality of filter units for receiving said liquid waste displaced out of said perforations of each of said units of said cylinder, comprising the steps of:

feeding said solid and liquid wastes into said cylinder;

progressively dewatering said waste within said front-most and central units by allowing said liquid waste to drain out of said perforations in said cylinder, thereby forming a collection of sedimentated solid wastes;

passing said collection of sedimentated solid wastes from said front-most unit to said central unit and further dewatering said solid wastes;

simultaneously oxygenating said front-most and central units during said dewatering;

simultaneously collecting said liquid wastes from said units comprising said cylinder;

passing said solid wastes from said central unit to said dry composting unit; and filtering said collected liquid wastes in a collection of filter units and simultaneously oxygenating said filter units.

2. The method according to claim 1, wherein the collecting of said liquid wastes comprises the further step of providing a perforated shaking plate in close approximation below said cylinder, said shaking plate having a pair of sides and a mid-part, said sides attached to respective sides of said envelope by springed hinges, said mid-point provided with a longitudinally extending hinge.

3. The method of claim 1, wherein dewatering within said central unit comprises passing said solid wastes through said central unit by a screw feeder attached to said a portion of said shaft extending within said central unit, and squeezing said solid waste between said screw feeder and said envelope, wherein said screw feeder further includes a cone attached at an end thereof to further squeeze said solid wastes between said cone and said envelope, said envelope being in close proximity to said screw feeder and provided with perforations for allowing dewatered liquids to be passed therethrough.

4. The method of claim 3, further including the step of securing a plate on said shaft, said plate disposed behind an entrance wall to said dry composting unit and in close proximity to said cone, such that said solid waste is further dewatered by squeezing said solid waste between said cone and said plate.

5. The method of claim 3, further including the step of securing a plate on said shaft, said plate disposed behind an entrance wall to said dry composting unit, such that said solid waste is further dewatered by squeezing said solid waste between said plate and wall.

6. The method of claim 1, wherein dewatering within said central unit comprises passing said solid wastes through said central unit, wherein said central unit has a reduced cylindrical diameter, such that said solid waste is squeezed into said central unit, said reduced diameter cylinder provided with perforations for allowing dewatered liquids to pass therethrough.

7. The method of claim 1, wherein said solid waste is continuously and automatically advanced through said cylinder from said front end to said back end and is automatically discharged through a pipe, and wherein the liquid wastes continuously and automatically flow through said filter units and are automatically evacuated through a pipe.

8. The method of claim 1, wherein the filters successively receive a liquid waste having a continuously diminishing number of dissolved particles therein when flowing from one filter unit to another.

9. A device for continuously treating and purifying biologically decomposable solid and liquid wastes, comprising:

a rotatably elongate perforated cylinder having a first, front end wall and a second, back end wall, said cylinder divided into a front-most combined dewatering and wet composting unit, a central dewatering unit, and a dry composting unit, said dry composting unit including a plurality of spaced ducts formed on an inner periphery thereof;

an envelope surrounding said perforated cylinder, said envelope having a front and back end wall corresponding to said end walls of said cylinder;

means for feeding said biologically decomposable solid and liquid wastes into said cylinder through said first end wall;

a rotatable, elongate, hollow shaft having a plurality of circumferentially disposed holes along the length thereof, said shaft centrally supported within said cylinder and attached to said cylinder so as to cause rotation of said cylinder upon a rotation of said shaft, said shaft extending beyond said front and back end walls of said cylinder and said envelope;

a plurality of filter units for receiving said liquid waste displaced out of said perforations of each of said units of said cylinder; and means for supplying air to said shaft and said filter units for oxygenating each of said units of said cylinder and each of said filter units.

10. The device of claim 9, wherein said shaft further includes a stop, an air distributing ring, and a combination feed screw and dewatering cone, said stop inserted within said shaft interior to form a front and back section of said shaft, said air distributing ring attached about said shaft with a bearing to form said second end wall of said cylinder, said combination feed screw and dewatering cone attached to said shaft within said dewatering unit of said cylinder, said air distribution ring including nozzles thereabout which communicate with said plurality of spaced ducts located within said dry composting unit, wherein air fed into said dry composting unit enters through said back section of said shaft and said air distributing ring.

11. The device according to claim 10, further including a shaking plate disposed in close approximation below said perforated cylinder for receiving a dissolved fraction of solid wastes, said perforations on said cylinder comprised of longitudinal slits, wherein liquid waste contained within each of said-units of said cylinder is communicated through said slits and deposited upon said shaking plate.

12. The filter device according to claim 9, wherein said plurality of filter units is comprised of:

i.) a first filter layer consisting of a non-decomposable trickling filter material for the purpose of purifying said liquid waste and decomposing of any biological substance in said liquid;

ii.) a second filter layer arranged below said first layer and consisting of one of a biological and synthetic material for the removal of a specific component in said liquid waste;

iii.) a third filter layer arranged below said second filter layer, said third layer consisting of said same material as said second layer;

iv.) a fourth filter layer arranged alongside said second and third filter layers, said fourth layer consisting of said same material as said second filter layer, said fourth filter for purifying said liquid waste gathered from said shaking plate, said dewatering unit and said combination dewatering and wet composting unit;

v.) a fifth filter layer disposed below said fourth filter layer, said fifth layer consisting of said same filter material as said first filter layer; and vi.) a sixth filter layer disposed below said fifth filter layer, said sixth filter layer consisting of said same filter material as said first filter layer.

13. The device according to claim 9, wherein said means for supplying air to said shaft comprises a fan coupled to a first feed pipe at said front of said cylinder and said same fan connected to a second feed pipe at said back of said cylinder, said first and second feed pipes surrounding said shaft so as to be in communication therewith, said means for supplying air to said filter units comprised of a second fan connected to a inlet pipe, said inlet pipe connected to a first unit pipe disposed below said second and third filter units, said first unit pipe including an air distributing pipe extending therefrom, said air distributing pipe connected to a second unit pipe disposed between said fifth and sixth filter layers, said air distributing pipe and second unit pipe in communication with said air being supplied into said first unit pipe.

* * * * *